(12) United States Patent
Lee et al.

(10) Patent No.: US 8,916,213 B2
(45) Date of Patent: Dec. 23, 2014

(54) ANIMAL FEED ADDITIVES BASED ON FERMENTATION BROTH AND PRODUCTION PROCESS THEREOF BY GRANULATION

(75) Inventors: Youn Jae Lee, Bucheon-si (KR); Yong Bum Seo, Seoul (KR); Seung Woo Han, Seoul (KR); Jae Hun Yu, Suwon-si (KR); Soon Won Hong, Seoul (KR); Gyu Nam Cho, Incheon (KR); Won Seop Choi, Seoul (KR)

(73) Assignee: CJ Corporation, Seoul (KR)

( * ) Notice: Subject to any disclaimer, the term of this patent is extended or adjusted under 35 U.S.C. 154(b) by 405 days.

(21) Appl. No.: 11/497,491

(22) Filed: Jul. 31, 2006

(65) Prior Publication Data
US 2007/0160740 A1 Jul. 12, 2007

(30) Foreign Application Priority Data
Jan. 10, 2006 (KR) .................. 10-2006-0002554

(51) Int. Cl.
*A23K 1/16* (2006.01)
*A23K 1/18* (2006.01)
*A23K 1/00* (2006.01)

(52) U.S. Cl.
CPC ............. *A23K 1/004* (2013.01); *A23K 1/002* (2013.01); *A23K 1/1634* (2013.01); *Y10S 426/807* (2013.01)
USPC .............. 426/69; 426/308; 426/656; 426/807

(58) Field of Classification Search
CPC ...... A23K 1/002; A23K 1/004; A23K 1/1634
USPC .................................. 426/69, 302, 656, 807
See application file for complete search history.

(56) References Cited

U.S. PATENT DOCUMENTS

| 5,431,933 A | 7/1995 | Binder et al. |
| 5,487,916 A * | 1/1996 | Christensen .................. 427/213 |
| 5,622,710 A | 4/1997 | Binder et al. |
| 5,840,358 A | 11/1998 | Höfler et al. |
| 5,990,350 A | 11/1999 | Stevens et al. |
| 6,017,555 A * | 1/2000 | Stevens et al. ................. 424/438 |
| 7,514,111 B2 * | 4/2009 | Hong et al. ..................... 426/69 |

FOREIGN PATENT DOCUMENTS

| EP | 0122163 A1 | 10/1984 |
| EP | A 0345717 | 12/1989 |
| EP | A 0491638 | 6/1992 |
| EP | 0923878 A2 | 6/1999 |
| EP | 1582101 A1 | 10/2005 |
| JP | 62-104553 | 5/1987 |
| KR | 10-2005-0097678 A | 10/2005 |

OTHER PUBLICATIONS

Office Action issued on Aug. 22, 2011 for German Application No. 10 2006 007 299.5.

* cited by examiner

*Primary Examiner* — Maria Leavitt
(74) *Attorney, Agent, or Firm* — Knobbe Martens Olson & Bear LLP (57) ABSTRACT

A process for the production of animal feed additives from fermentation broth containing L-lysine is disclosed. The process does not require filtering of biomass in order to remove the biomass and produces granulated lysine of controllable lysine content with a high bulk density, low viscosity, and a low hygroscopic property which does not require the addition of an anti-absorptive substance. In this process, a lysine fermentation broth produced after slant culture, flask culture, seed process, and cultivation process is concentrated to a solid content of about 44~52%. A product with low hygroscopicity, high bulk density, and the intended amount of contents is produced after being mixed with substances for controlling the amount of contents and granulated by coating the surface of the seeds. This process enables a production of animal feed additives having a lysine-HCl content of at least 65%, a water content of at most 3%, and a bulk density of 670±50 kg/m$^3$.

16 Claims, 4 Drawing Sheets

ANIMAL FEED ADDITIVES BASED ON FERMENTATION BROTH AND PRODUCTION PROCESS THEREOF BY GRANULATION

CROSS-REFERENCE TO RELATED APPLICATIONS

This application claims the benefit of Korean Patent Application No. 2006-0002554, filed on Jan. 10, 2006 in the Korean Intellectual Property Office, the disclosure of which is incorporated herein by reference.

BACKGROUND OF THE INVENTION

1. Field of the Invention

The present invention relates to animal feed additives based on a lysine fermentation broth produced by simple granulation and a process for their production.

2. Description of the Related Technology

The traditional powder form of lysine is hard to work with because it is easily shattered and has poor flow properties, causes losses of ingredients, is harmful to workers, takes up a large volume because it contains excipient or content-controlling agent, and is unsafe and inconvenient to store because of its high hygroscopicity. Concentrated, granulated lysine additives have been developed and used in order to overcome these disadvantages. Lysine is one of the most frequently-used amino acids in the animal feed industry. The most common form of L-lysine has been produced by processes of fermentation, filtering, crystallization, and dehydration in the form of L-lysine-HCl.

To explain simply the processes of production, a lysine fermentation broth is first filtered or centrifuged to remove micro-organisms. Then, L-lysine made by using an ion-exchange resin is concentrated. HCl is then added to the concentrated L-lysine in order to produce L-lysine-HCl. A product of L-lysine-HCl:$2H_2O$ is made by crystallizing L-lysine-HCl, and by dehydrating this, a product with less than about 1% of water is obtained.

This procedure has a number of shortcomings. Since the product is in the form of powder, a lot of dust is created, resulting in a loss of the product. Furthermore, the powder dust in this working environment can harm the health of workers and interfere with their work.

Filtering or centrifuging the fermentation broth in order to remove micro-organisms is one of the causes of lowering the yield. In addition, the high cost for filters or centrifuges is one of the reasons of increased cost price. Since biomass decreases in the process of filtering the fermentation broth, there is the disadvantage of decreased protein content in the product.

The use of ion-exchange resins is another defect. The high price of ion-exchange resin itself raises the cost price, and the enormous amount of wastewater from the ion-exchange and its treatment are problems. The wastewater is an important problem not only because it requires a high cost for disposal but also because enormous environmental pollution resulting from an accident can ruin the image of a company in the current atmosphere of emphasizing preservation of the environment.

A solution for these disadvantages is a graulating method. Since a graulated product may be obtained from a granulator immediately after a concentration process of a fermentation broth, the whole process may become much simpler than the method described above. Therefore, avoiding the use of expensive filters and ion-exchange resins results in a reduced cost price, decreased complexity of the whole process due to elimination of numerous filtering processes, and relatively simpler tasks for production, thereby producing products at a far lower price than the previous method.

However, the graulating-dehydration method may have a number of disadvantages. This method yields lower product content than the previous method. Contents other than lysine remain relatively higher because the filtering steps are simpler than the previous method. However, this is not a big problem. Since lysine is added in small amounts as an animal feed additive, the purity of lysine does not need to be very high. The second disadvantage is that this method may yield product contents that vary greatly. Since products are made directly from the concentrated fermentation broth, product contents are affected by the concentration of the fermentation broth. As the previous method employs many steps of filtering processes, the effect of the broth on the product contents is minimal. However, the granulating-dehydration method has a lesser number of processes. Since the contents of a fermentation broth varies significantly according to the conditions for the fermentation, it is usual for the contents to have some degree of fluctuation. Because of this, contents of pelletized products may have unreliable, varying content compositions.

Relating to the graulating, Masters, K. Spray Drying: An Introduction to Principles, Operational Practice and Applications. Chemical Process and Engineering Series: Leonard Hill Books London, 1972 states the second step of the procedure, the process of dehydration and agglomeration of yeast of the animal feed yeast process.

In addition, Japanese Laid-open publication No. 56-35962 (Apr. 8, 1981), describes the process for the production of pellets less than 1 mm in size using a fluidized bed granulator and dryer from slaked lime and a lysine concentrate.

EP 0122163A1 (Oct. 17, 1984) describes solid, stable animal feed composition which consist of 35-48% lysine, 10-15% proteins, 1-3% lactic acid, 2-8% other acids with less than 8 carbon atoms, 2-7% carbohydrates and oligosaccharides, 1-6% lipids and oil, 0.5-3% water, and 10-25% minerals. It is stated that, in making this kind of animal feeds, micro-organisms are not separated from the fermentation broth but destroyed, the broth is concentrated at 110-120° C., and the animal feeds are finally produced after drying steps such as a spray method, kneading granulation, a dry-flaking method, and azeotropic drying. It is also stated that the sugar concentration is kept between 5-15 g/l during the fermentation and it is controlled by stopping the fermentation when the concentration of remaining sugars is below 2 g/l.

EPA 0345717 (Dec. 13, 1989) relates to the production of riboflavin as an animal feed additive from a fermentation broth. Particles of certain sizes are selected to produce riboflavin granules after drying a fermentation broth in a spray method, pulverizing particles of excessive or deficient sizes, and re-circulating them. The pelletizing process of a fermentation broth by the second step of the procedure is described, and it is stated that fine particles used for the second-step granulation can be produced by drying in a spray method. 90% of the particles have a size less than 1 mm in diameter and density of 550 kg/$m^3$.

In addition, Japanese Laid-open publication No. 62-104553 (May 15, 1987) relates to a process for the production of stable, solid nutritional additives with 50-70% of lysine hydrochloride from culturing micro-organisms for lysine production. It states that micro-organisms are eliminated from a fermentation broth by separation, filtering, and active carbons as a pre-step, that the broth is concentrated at 20-80° C., and that final products have good free flow property and storage safety by graulating in Filtermat Spray Dry method.

In addition, SU-A-1 735 365 (May 23, 1992) describes a process for the production of animal feed additives with a granular size of 2-4 mm in diameter by mixing fine particles obtained from drying a portion of a culture of micro-organisms with a concentrate of the rest of the culture and making them agglomerate.

In relation to pelletization of L-lysine HCl, EPA 0491638 (Jun. 24, 1992) describes a process for the production of pelletized fine particles in a fluid dryer with a spray method and states that it is advantageous in packing pellets that are 425-1000 μm in diameter. This patent relates to the production of pellets by coating a fluidized bed with solid lysine hydrochloride particles and spraying liquid lysine hydrochloride. Various mechanical stirring machines, for example a drying drum granulator, can be used instead of a fluidized bed.

U.S. Pat. No. 5,431,933 (Jul. 11, 1995) explains a process for the production of pellets that are easy to store and have a lower content of proteins, compared to the feeds produced from a fermentation broth. It is stated that pellets can be directly obtained from drying a fermentation broth together with already separated biomass in a spray method. While the document states that the method yields more than 40% of amino acid contents, it is inadequate to produce this kind of fermentation broth on an industrial scale. The bulk density of the product is even as low as 500-530 kg/m$^3$, as seen in embodiments.

Furthermore, the patent sets the protein content to be less than 10% by weight in order to prevent environmental pollution, and it needs to separate biomass from the fermentation broth. It is stated in Feed Magazine 1/91 which is published before this patent that a decrease in the protein content in feeds reduces environmental pollution.

U.S. Pat. No. 5,622,710 (Apr. 22, 1997) relates to a process for the production of animal feed additives using a fermentation broth without byproducts that cause problems. In this method, fine particles produced in the first step are used to make a final product by a pelletizing process. Products made by this method of the patent have a bulk density of at least 550 kg/m$^3$, more than 33% of the amino acids content, a low hygroscopicity and viscosity. Products with an amino acid content of 40~90% can be made with this method. In particular, a fermentation broth is prepared by culturing bacteria under sugar-limiting conditions in which the assimilable sugar concentration is kept or decreased below 0.3% by weight, fine particles in a form of powder of which 70% by weight have a granular size of at most 100 μm are obtained by drying the broth in a spray method, then pellets are produced by mixing the particles strongly with a selected binder from a mixture of water and the fermentation broth. 90%, by weight, of the produced pellets have a size of less than 1 mm, and 10%, by weight, of the pellets are less than 100 μm in size.

The drying-pelletizing process of this patent comprises a step of obtaining and spray-drying 70% of fine particles less than 100 μm in size and another step of forming pellets from fine particles by adding water or a fermentation broth as a binder.

U.S. Pat. No. 5,840,358 (Nov. 24, 1998), relates to a process for the production by pelletizing, compacting and drying a concentrated fermentation broth using a pellet dryer as a one-step process. In the method of the patent, products are obtained directly from amino acid fermentation broth in one step of successive processes. In the method, however, additional energy is needed for mechanical devices inside the granulator for the compacting process.

In relation to a process for maintaining a uniform level of lysine, U.S. Pat. No. 5,990,350 (Nov. 23, 1999) and U.S. Pat. No. 6,017,555 (Jan. 25, 2000) describe a process for the production of a lysine product by concentrating a fermentation broth in which biomass is separated, mixing the broth with refined lysine, and adjusting the lysine content to be 35-76%. In the methods, the ratio between a concentrate of the fermentation broth and the refined product must be 2:3 in order to produce a product with at least 55% lysine content.

The discussion in this section is to provide information about related technology and does not constitute an admission of prior art.

SUMMARY OF CERTAIN INVENTIVE ASPECTS

One aspect of the invention provides a method of making an animal feed additive. The method comprises: supplying particles into a chamber; blowing air in the chamber upward from under the particles such that a least part of the particles float within the chamber; spraying a liquid composition comprising L-lysine in the chamber while blowing air in the chamber, wherein the liquid composition is coated over individual particles floating within the chamber, wherein the liquid composition coated over the particles is dried by the air blown in the chamber; and subsequently discharging the particles from the chamber.

In the method, coating of the liquid composition over particles and drying of the liquid composition coated over the particles may be alternated a plurality of times within the chamber. The discharged particles may comprise a core and a plurality of layered shells surrounding the core.

Blowing air may cause the particles to travel up and down within the chamber, and while traveling the particles may be coated with the liquid composition when located lower and dried when located upper. The liquid composition may be sprayed upward from below the particles floating within the chamber. The liquid composition may be sprayed at a pressure between about 1.8 and about 2.0 bar. The liquid composition may be substantially continuously sprayed. The liquid composition may be noncontinuously sprayed. The air may have a temperature between about 60° C. and about 70° C. The air may be blown at a pressure from about 0.1 to about 0.2 kg/cm$^2$.

The method may not comprise pulverizing the coated particles prior to discharging from the chamber. The particles when supplied to the chamber may have a diameter between about 200 μm and about 500 μm. At least part of the discharged particles may have an onion-like cross-section. About 60% to about 70% of the discharged particles may have a diameter between about 1,000 μm and about 1,300 μm. About 20% to about 30% of the discharged particles may have a diameter between about 500 μm and about 1,000 μm.

The diameter of the discharged particles may be controlled by adjusting the pressure of spraying the liquid composition. The diameter of the discharged particles may be controlled by adjusting the pressure of the air. The method may further comprise sieving the discharged particles to collect particles having a desired range of diameter.

Another aspect of the invention provides an animal feed additive made by the method described above.

Yet another aspect of the invention provides an animal feed additive comprising: a plurality of particles comprising L-lysine, at least part of the plurality of particles comprising a core and multiple layered shells surrounding the core. The core may have a diameter between about 200 μm to about 50 μm.

Another aspect of the invention provides an animal feed, comprising the animal feed additive described above.

DETAILED DESCRIPTION OF CERTAIN INVENTIVE EMBODIMENTS

A process for the production of animal feed additives by directly drying and granulating a lysine fermentation broth is complex and lowers productivity. Products produced in this method are hard to handle due to their low bulk density, and it is hard to produce a product with a consistent amount of lysine because product contents fluctuate, depending on the fermentation broth.

One embodiment of the invention relates to a process for the production of animal feed additives which may not require a complex filtering process in order to eliminate biomass. The process produces a product with a low hygroscopicity without adding an anti-hygroscopic substance such as silica, increases lysine content because of the absence of an anti-hygroscopic substance, raises productivity with a simple procedure, and is based on a lysine fermentation broth made from materials with a uniform content of lysine.

In particular, a concentration of an L-lysine fermentation broth is optionally mixed with a content-controlling agent or free lysine, and fine seed particles between about 200 and about 500 µm in size from granulators are coated with the mixture above, thus enlarging the size of the fine seed particles. Then, animal feed additives are produced so that about 0-5% of granules are smaller than about 500 µm, about 20-30% of granules have a size between about 500 µm and about 1000 µm, about 60-70% of granules have a size between about 1000 µm and about 1300 µm, and about 0-5% of granules have a size greater than 1300 µm.

This embodiment enables the production of products, maintaining the lysine content within about 1% difference. Since the dense granular structure blocks the contact with water, the hygroscopicity, one of the important physical properties, of granular products used as animal feed additives is minimized and products maintain a low hygroscopicity for a long time.

Products in which about 0-5% of granules are less than about 500 µm in size, about 20-30% of granules are between about 500 µm and about 1000 µm, about 60-70% of granules are between about 1000 µm and about 1300 µm, and about 0-5% of granules are greater than about 1300 µm are made through a recycling process.

According to an embodiment, it provides a process for producing animal feed additives the following composition based on lysine fermentation broth. The process comprises the steps of:

(a) concentrating an L-lysine fermentation broth directly to a total solid of about 48-52%, by weight, without undergoing a filtering process such as membrane filtering;

(b) forming a mixture concentrate by mixing the concentrate with a content-controlling agent or free lysine; and (c) forming granules comprising the steps of introducing fine particle seeds of about 200-500 µm into a granulator, increasing the size of fine particle seeds as they are coated with the sprayed mixture concentrate above from the bottom of the granulator, and forming granules with an onion-like structure without applying mechanical physical devices, so that about 0-5% of the granules have a granular size of at most about 500 µm, about 20-30% are about 500 µm to about 1000 µm, about 60-70% are about 1000 µm to about 1300 µm, and about 0-5% are greater than about 1300 µm.

| | |
|---|---|
| Contents | At least about 65%, by weight, of lysine-HCl |
| Granular size | about 0-5% less than about 500 µm, |
| | about 20-30% between about 500 µm and about 1000 µm |
| | about 60-70% between about 1000 µm and about 1300 µm |
| | about 0-5% greater than about 1300 µm (by weight) |
| Bulk density | about 620-720 kg/m$^3$ |
| Proteins | about 10-15% by weight |
| Total Sugars | Less than about 1% by weight |
| Minerals | Less than about 3% by weight |
| Water | Less than about 3% by weight |
| Carboxylic acids (with less than 8 carbon atoms) | Less than about 8% by weight |

In the step of forming the mixture concentrate, the final lysine content is adjusted to within about 1% of the intended content by controlling the amount of lysine or a content-controlling agent. The granulation is done by spraying the mixture concentrate from a nozzle at the bottom of the granulator and providing a hot wind, forming a fluidized bed.

Granulation may be controlled by adjusting the fluid speed of the mixture concentrate, the pressure of the nozzle, and the air flow of the hot wind.

The content-controlling agent may be one or more of starch, carrageenan, and agar. In one embodiment, *Corynebacterium* is used as lysine-producing microorganism.

Although products in this embodiment have an anti-hygroscopic property without the use of an anti-hygroscopic substance, silica, polymers, or liquid paraffin can be used.

Figure 1:
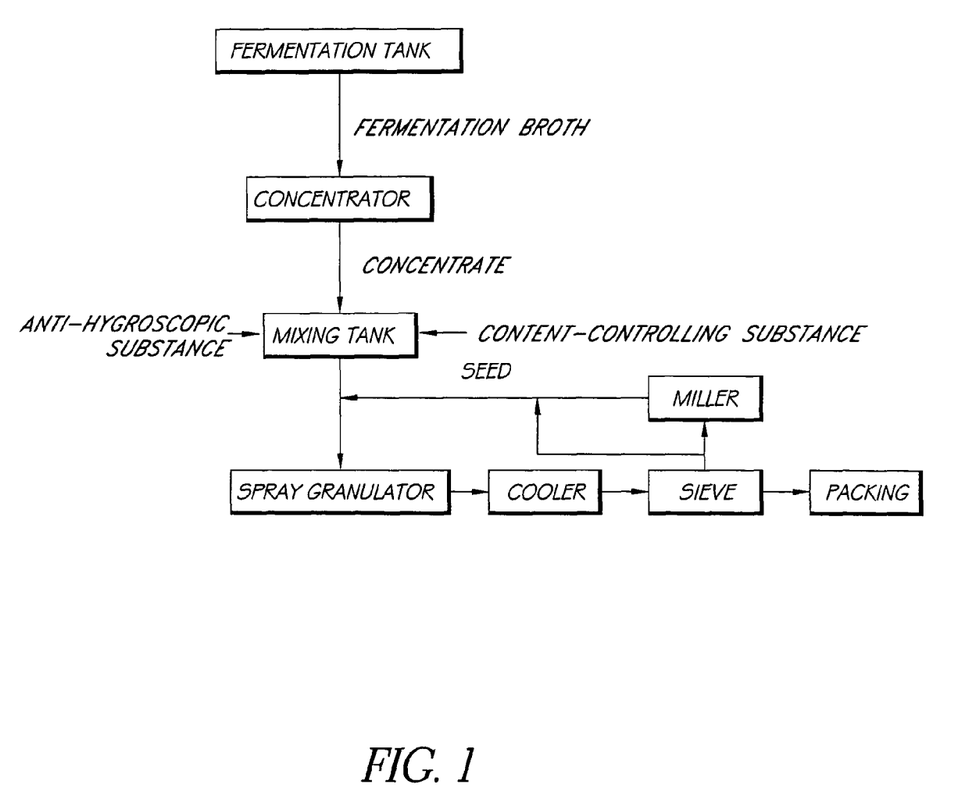
FIG. 1 is a block diagram illustrating the production process according to one embodiment.

According to another embodiment, animal feed additives based on granulated lysine fermentation broth are produced by the procedure below. Refer to the attached figures for explanations below. Referring to the outline of the production process in FIG. 1, first, a lysine fermentation broth is produced using lysine-producing biomass. Any micro-organism that produces lysine can be used as the biomass in the embodiment. In particular, *Corynebacterium* may be an organism for lysine fermentation. There is no special limitation in the condition for fermentation of the micro-organism. In one embodiment, biomass is cultivated in a condition which allows a small amount of biomass although a large amount of lysine accumulates in the fermentation broth.

Since sugar in a fermentation broth interferes with drying of the fermentation broth and increases the hygroscopicity of the final product, the broth may be cultured in a condition which reduces the amount of sugar. However, conditions for fermentation do not need to be ones listed above since, using this embodiment, the process of mixing controls the lysine content and the surface of the product is dense. An application of this embodiment indicates that a fermentation broth obtained from culturing biomass in *Corynebacterium* contains about 10-20% of lysine with a density of about 170 g/l.

A fermentation broth produced in this method is concentrated in the process of removing some water. This concentrating process has two purposes: to reduce post-production tasks by reducing the volume of fermentation broths by concentration and, more importantly, and to more easily form granules by raising the lysine density of the broth.

The amount of the total solid of the fermentation broth is adjusted to be about 44-52% through the concentrating process in which the method is vacuum concentration with a pressure of about 680 mmHg and a bath temperature of about 65° C. These conditions can be changed according to the status of the concentration process or in order to control the speed of the progress.

The fermentation broth in which concentration is completed goes through a pH adjustment process. The pH is adjusted to about 3.5 by using sulfuric acid. After the pH adjustment, the broth is left at about 60° C. for more than two hours. A broth is left at about 60° C. for at least two hours following the pH adjustment because genomic deoxyribonucleic acid (gDNA) materials of fermentation biomass which can be found in granular products have to degrade. Considering the cost for the development of new microorganism strain and the effect of the microorganism itself on the productivity, the security of microorganism is of enormous importance. This process enables satisfactory degradation of gDNA materials and lowers the possibility of leakage of the microorganism.

Following the gDNA degradation, the concentrate is transferred to a mixture tank. The mixture process has several purposes. The most important purpose is to control the lysine content of produced granular products to an intended level. The concentrate is mixed with a content-controlling substance in the mixture process. The content-controlling substance can be either a content-controlling agent or free lysine, depending on the content of the concentrate. Any suitable free lysine and content-controlling agents can be used. In one embodiment, the content-controlling agent is one or more of corn starch, starch, carrageenan, and agar.

A content-controlling agent may be added to a concentrate when the lysine content of the concentrate is too high. On the other hand, when the lysine content of the concentrate is too low, lysine powder is added to the concentrate to increase the lysine content. The content-controlling method of the embodiment sets the final product content within about 1% error.

Subsequent to the mixture process, the mixture broth undergoes the granulation process. Particle size distribution, bulk density, and contents vary according to the work condition of the granulation process. In this embodiment, granules grow to have onion-shaped cross-sections by coating seeds with layers of the concentrate of the fermentation broth. A separate miller may be provided outside the granulator without having blades or a grinder inside. Because installation of a mechanical device such as blades inside the granulator prevents formation of dense particles due to physical force, it may be hard to form granules whose cross-sections have an onion-like structure.

Figure 2:
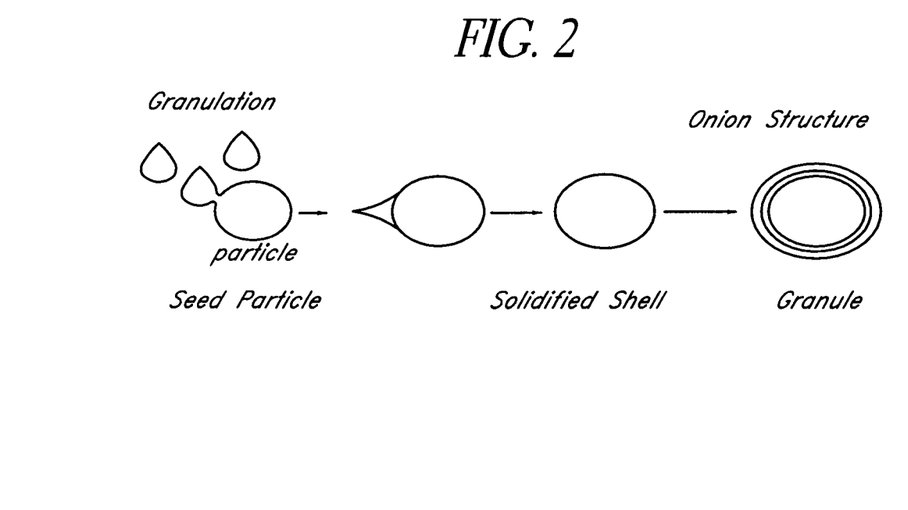
FIG. 2 illustrates the mechanism of a process for granule formation according to one embodiment.

In order to form granules with an onion-like structure, the granulator is provided with seeds of 200-500 μm in size in the granulation process. The concentrate obtained from the concentration process above is then sprayed into the granulator through a nozzle at the bottom of the granulator. As the sprayed concentrate travels upward by the propulsive pressure of the nozzle, seeds inside the granulator become coated with the concentrate. After the coated seeds stop ascending because of gravity, they descend and then start to ascend again by the sprayed concentrate from the nozzle and the hot wind or air from the bottom of the granulator. The layer formed in the process of the repetitive ascending and descending of the particles is called a fluidized bed. As illustrated in FIG. 2, granules are formed and grow in size as seeds are continuously coated with the sprayed broth in an onion-like structure within the fluidized bed. The sprayed concentrate dries and solidifies by the high temperature within the granulator and the hot wind from the bottom and forms granules with an onion-like structure as repeating the drying process by colliding with the concentrate which is continuously sprayed from the bottom.

A method (disclosed in U.S. Pat. No. 5,622,710) described in FIG. 3, consists of two steps of forming fine particles smaller than about 100 μm and making raspberry-structured pellets using a mechanical force of blade with a fermentation broth as a binder. Therefore, the above-described embodiment employs a new mechanism since granular pellets grow in size as fine particle seeds with a size of about 200-500 μm are coated with a concentrate of the fermentation broth and then dried.

Figure 3:
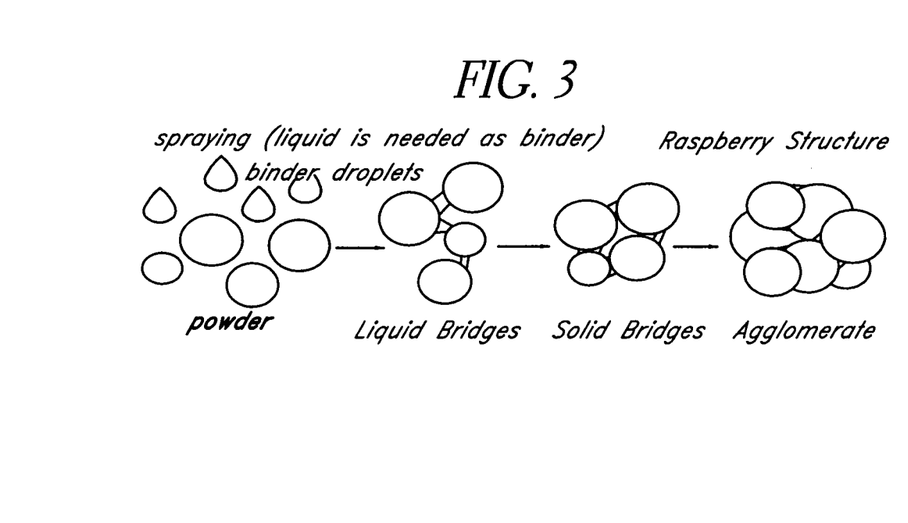
FIG. 3 explains the mechanism of a process of forming pellets.
Figure 4A:
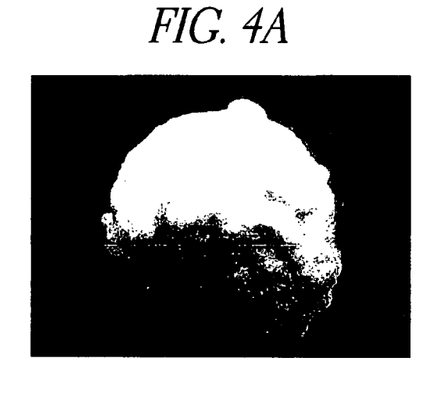
FIG. 4 is a micrograph, taken with a scanning electron microscope, of a granule particle formed by the process of one embodiment and its cross-section.
Figure 4B:
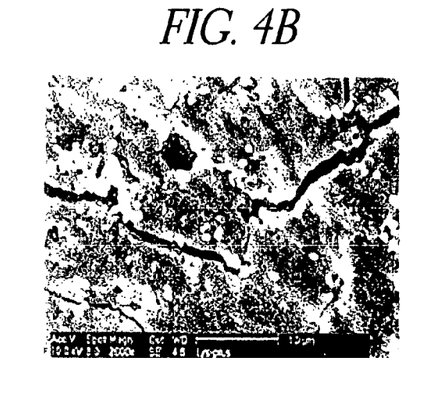
Figure 5A:
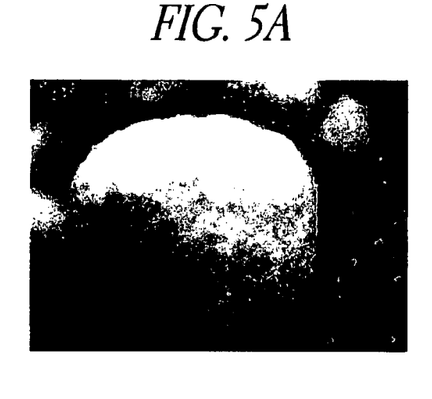
FIG. 5 is a micrograph, taken with a scanning electron microscope, of a pellet particle formed by the method of FIG. 3 and its cross-section.
Figure 5B:
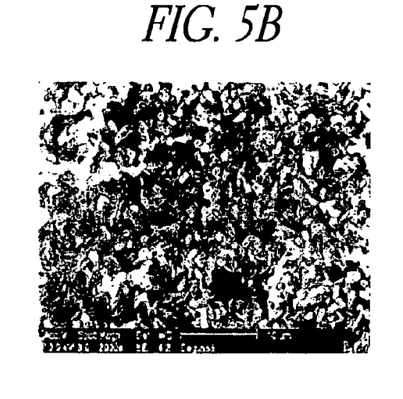
Figure 6:
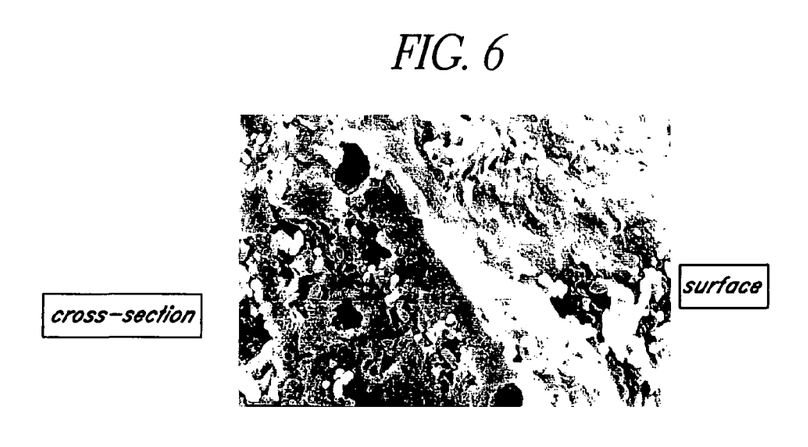
FIG. 6 is a micrograph, taken with a scanning electron microscope, of a coated L-lysine particle according to one embodiment.
Figure 7:
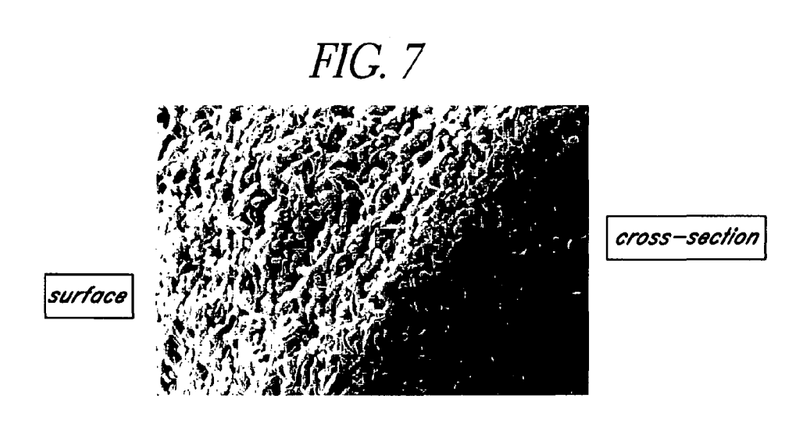
FIG. 7 is a micrograph, taken with a scanning electron microscope, of a coated L-lysine particle according to another embodiment.

Because the mechanism of granular growth is novel, the produced granules and their shapes are different from ones produced by the method of FIG. 3. FIGS. 4 and 5 shows micrographs of granules or pellets and electron micrographs (2000 times) of their outer shapes and their cross-sections produced by the embodiment and the method of FIG. 3, respectively.

Granules produced by the method of the embodiment were made in the applications below. Pellets produced by the method of FIG. 3 are BIOLYS™ which are available from Degussa AG, the patent holder of U.S. Pat. No. 5,622,710.

As seen in the figures, granules produced by two different methods have similar outer shapes. However, cross-sections reveal that the granules produced by this embodiment have smooth surfaces inside and outside the granules while it is observable that pellets produced by the prior method are agglomerated.

Granules whose size has been enlarged to some extent by the granulation process above become too heavy to be lifted by the hot wind and accumulate at the bottom. In some cases, fine particles and sprayed broth ascend too high. A bag filter is installed at the top of the granulator to avoid the loss from this phenomenon and does shaking in order to shake off the fine dust stuck to the bag filter on a regular basis.

In one embodiment, the granulation process employs a heater temperature of about 170° C., an inlet temperature of about 140-160° C., an outlet temperature of about 60-70° C., and a spray pressure of about 1.8-2.0 bar. The hot wind or air may be blown at a pressure from about 0.1 to about 0.2 kg/cm$^2$.

Following the granulation process, the product undergoes a cooling process to minimize the hygroscopicity.

Once the granulation process and the cooling process are completed, the product has a broad particle size distribution. Some particles are too big and some are too fine to be included in the final product. Therefore, a process for classifying granules according to the size is needed after the production of granules. This process is called a sieving process. Granules with an adequate size undergo the next step, and granules with an inadequate size are recycled as seeds after the grinding process by a miller.

In this embodiment, granules with a granular size of greater than about 1,300 μm are pulverized and returned to the granulator, and granules smaller than about 500 μm are directly returned to the granulator to be used again as seeds for additional granulation.

The granulated products, in general, have a low bulk density. A low bulk density makes the product hard to handle with. The embodiment has considerably increased the bulk density up to about 620-720 kg/m³ by producing granulated products with an onion-like structure after coating seeds with the concentrate.

A final product according to the embodiment has the following matter composition:

| | |
|---|---|
| Contents | At least about 65%, by weight, of lysine HCl |
| Granular Size | about 5% less than about 500 μm |
| | about 20-30% between about 500 μm and about 1000 μm |
| | about 60-70% between about 1000 μm and about 1300 μm |
| | Less than about 5% greater than about 1300 μm (by weight) |
| Bulk Density | about 620-720 kg/m³ |
| Proteins | about 10-15% by weight |
| Total Sugar | Less than about 1% by weight |
| Minerals | Less than about 3% by weight |
| Water | Less than about 3% by weight |
| Carboxylic acid (with less than 8 carbon atoms) | Less than about 8% by weight |

Example 1

Formation of Granules Directly from the Fermentation Broth

Lysine fermentation using *Corynebacterium glutamicum* CJM107 (KCCM-10227) was conducted for 98 hours at a temperature of 35° C. on a culture medium with a pH scale of 6-8 containing 50 g of sugar, 10 g of peptone, 10 g of yeast extract, 5 g of urea, 4 g of $KH_2PO_4$, 8 g of K2HPO4, 0.5 g of $MgSO_4 \cdot 7H_2O$, 100 μg of biotin, and 1,000 μg of thiamin HCl per 1 liter of water. The lysine content of the fermentation broth was 18%.

After the fermentation broth was concentrated to a total solid of 55.2% by weight by vacuum concentration, its pH was adjusted to 3.5-3.6. Sulfuric acid was used to adjust the pH, and the concentrate was left for 2.5 hours after the pH adjustment.

The concentrate in which gDNA degradation is completed was introduced to a granulator in a bottom spray style via the bottom nozzle of the granulator (GR Engineering, Fluid Bed Spray Dryer Batch type Pilot). The granulator had a temperature of 170° C., an inlet temperature of 140-160° C., an outlet temperature of 60-70° C., and a spray pressure of 1.8-2.0 bar. The seeds were made in Spray Dry method, with a size of 300 μm. The concentrate was introduced into the granulator solidified by the hot wind, and granules grew in size by newly incorporated concentrate as the broth flew within the fluidized bed. Once the granular size reached the desired dimension, the granulator was turned off and the contents and compositions of the product were analyzed.

Granules of this embodiment had 68% lysine, 15% proteins, 0.02% water, 1.6% minerals, and a bulk density of 665.1 kg/m³. 4% of the granules had a granular size of less than 500 μm, 25.6% had a size between 500 μm and 1000 μm, 67.4% had a size between 1000 μl and 1300 μm, and 3% had a size of greater than 1300 μm.

Example 2

Adjusting Contents by Adding Free Lysine to the Fermentation Broth

After fermentation in the same condition as Example 1, the fermentation broth (14.5% of lysine) was concentrated to a total solid of 51.5% by weight. This was mixed with 8 g of free lysine (a CJ product) and granulated in the same condition as Example 1.

The final product had 68% lysine, 14% proteins, 0.13% water, 2.50% minerals, and a bulk density of 665.51 kg/m³. 3% of the granules had a granule size less than 500 μm, 28% had a size of 500 μm to 1000 μm, 67% had a size of 1000 μm to 1300 μm, and 2% had a size greater than 1300 μm.

Example 3

Adjusting Contents by Adding Content-Controlling Agents to the Fermentation Broth After fermentation using the same conditions as Example 1, a fermentation broth with lysine content of 20% and 25.8% of total solids was obtained.

After the fermentation broth was concentrated, an excipient consisting of 0.5 L of water and 0.22 kg of corn starch was added to the mixture tank as a content-controlling agent and was mixed with the broth.

After the filtered fermentation broth was concentrated to a total solid of 50.5% by weight by vacuum concentration, it was granulated in the same condition as Example 1.

The final product of this example had 66% lysine, 14% proteins, 0.24% water, 1.88% minerals, a bulk density of 682.5 kg/m³. 4% of the granules had a granular size less than 500 μm, 29% were 500 μm to 1000 μm, 63% were 1000 μm to 1300 μm, and 4% were greater than 1300 μm.

Example 4

A Hygroscopicity Comparison Between a Product of the Embodiment and a Product of the Previous Method 10 g of each sample of granule A, B, and C were placed on each plate (50 ml) inside an Temperature-humidity Controller (EYELA™). An experiment which compares hygroscopicities according to the increase in mass was conducted after the samples were left at 25° C. and a relative humidity of 75% for 7 hours.

| | A | B | C | remarks |
|---|---|---|---|---|
| moisture content increasing rate | 11% | 9.4% | 9.3% | |

A: the fermentation broth was directly granulated after membrane filtering to remove biomass
B: the fermentation broth was granulated (granulation without removing biomass and adding an anti-hygroscopic substance: the embodiment)
C: coating after addition of an anti-hygroscopic agent (silica) after membrane filtering to remove biomass This experiment revealed that A had the highest hygroscopicity of granules after the membrane filtering to remove biomass and that the hygroscopicity of the embodiment (B) and that of granules coated with an anti-hygroscopic agent (silica) after removing biomass were about the same. In spite of having simplified the production process in the embodiment (B), these two methods had an equal or better improvement of the hygroscopicity. Therefore, the embodiment has an advantage of preventing water absorption without a process of adding an anti-hygroscopic substance and of increasing the lysine content.

Animal feed additives according to the embodiment have a high bulk density, a uniform level of lysine content, and a simplified production process. The new method does not require a filtering process to remove biomass which makes the procedure more complicated. It enables the production of a product to within 1% of the intended lysine content with an improved hygroscopicity and a high bulk density without adding an anti-hygroscopic substance at a low cost. In addition, a low content of sugars reduced the hygroscopicity of the product, and this accordingly improved the lysine content as well.

Furthermore, the embodiment suggests a method of gDNA degradation which protects from leakage of gDNA whose strain is obtained at the expense of enormous time and funds. The embodiment enables satisfactory degradation of gDNA and lowers the leakage of biomass.

What is claimed is:

1. A method of making animal feed additive particles having an onion-like cross-section, the method comprising:
   1) providing a granulator comprising a chamber, providing a liquid composition comprising a mixture concentrate comprising an L-lysine fermentation broth having about 48 wt % to about 52 wt % of solid particles, and supplying seed particles of 200-500 μm in size into the chamber,
   2) blowing heated air in the chamber upward from under the particles to float at least part of the seed particles; upwardly spraying the liquid composition from below the particles floating within the chamber, wherein the liquid composition is coated over individual particles floating within the chamber, wherein the liquid composition is repeatedly coated over the particles and dried by the air blown in the chamber to form a core and a plurality of layered shells surrounding the core, wherein the heated air is blown at a pressure of 0.1 to about 0.2 kg/cm$^2$, and
   3) collecting the onion-like animal feed additive particles from the chamber, wherein about 0-5% of the onion-like particles collected have a granule size of smaller than about 500 μm, about 20-30% of the onion-like particles collected have a granule size of about 500 μm to about 1000 gm, about 60-70% of the onion-like particles collected have a granule size of about 1000 ~tm to about 1300 μm, and about 0-5% of the onion-like particles collected have a granule size of greater than 1300 μm.

2. The method of claim 1, wherein the liquid composition is sprayed at a pressure from about 1.8-2.0 bar.

3. The method of claim 1, further comprising: adjusting either or both of the pressure of spraying the liquid composition and the pressure of blowing the heated air for a desired distribution profile of the collected particles.

4. The method of claim 1, wherein the onion-like particles have a bulk density of about 670±50 kg/m$^3$.

5. The method of claim 1, wherein the heated air is supplied to the granulator at a temperature of about 140-160° C.

6. The method of claim 1, wherein the liquid composition comprises free lysine or a content-controlling agent.

7. The method of claim 1, wherein the liquid composition further comprises:
   an amount of free lysine or an amount of content-controlling agent,
   wherein the amount controls the lysine content of the animal feed additive particle to be about 65 wt % or greater.

8. The method of claim 1, wherein providing the liquid composition comprises:
   providing an L-lysine fermentation broth;
   concentrating the broth directly without filtering; and
   adding, to the concentrate, a content-controlling agent or free lysine, thereby providing the liquid composition.

9. The method of claim 1, wherein a nozzle for upwardly spraying the liquid composition is located at the bottom of the granulator.

10. The method of claim 1, wherein the granulator comprises a bag filter installed in a top portion of the chamber.

11. The method of claim 1, wherein the liquid composition is continuously sprayed.

12. The method of claim 1, wherein the liquid composition is non-continuously sprayed.

13. The method of claim 1, further comprising cooling the collected particles subsequent to collecting.

14. The method of claim 1, further comprising:
   sieving to classify the collected particles based on their sizes; and
   returning, to the chamber, particles having a diameter smaller than about 500 μm.

15. The method of claim 14, further comprising:
   subsequent to sieving, pulverizing particles having a diameter greater than about 1300 μm.

16. A method of making animal feed additive particles having an onion-like cross-section, the method comprising:
   providing a granulator comprising a chamber;
   supplying seed particles of 200-500 μm in size into the chamber;
   providing a mixture concentrate comprising an L-lysine fermentation broth having about 48 wt % to about 52 wt % of solid particles, the mixture concentrate further comprising an amount of free lysine or content-controlling agent, wherein the amount controls lysine content of animal feed additive particles to be about 65 wt % or greater;
   creating particles having an onion-like cross-section by:
      blowing heated air in the chamber upward from under the particles to float at least part of the seed particles; upwardly spraying the mixture concentrate from below the particles floating within the chamber, wherein the mixture concentrate is coated over individual particles floating within the chamber, wherein the mixture concentrate is repeatedly coated over the particles and dried by the air blown in the chamber to form a core and a plurality of layered shells surrounding the core,
      wherein the heated air is blown at a pressure from about 0.1 to about 0.2 kg/cm$^2$; and
   subsequently collecting the onion-like particles from the chamber, wherein about 0-5% of the onion-like particles collected have a granule size of smaller than about 500 μm, about 20-30% of the onion-like particles collected have a granule size of about 500 μm to about 1000 μm, about 60-70% of the onion-like particles collected have a granule size of about 1000 μm to about 1300 μm, and about 0-5% of the onion-like particles collected have a granule size of greater than 1300 μm.

* * * * *